United States Patent

Banda

[11] Patent Number: 5,927,733
[45] Date of Patent: Jul. 27, 1999

[54] FOLDING, PORTABLE, NON MOTORIZED TWO WHEEL SCOOTER

[76] Inventor: Juan Antonio Heyer Banda, 3221 Vineland Ave. #51, Baldwin Park, Calif. 91706

[21] Appl. No.: 09/078,859

[22] Filed: May 14, 1998

Related U.S. Application Data

[60] Provisional application No. 60/066,732, Nov. 21, 1997.

[51] Int. Cl.⁶ ................................................. B62K 9/00
[52] U.S. Cl. ................ 280/87.041; 188/19; 188/72.1; 280/87.05
[58] Field of Search .................. 280/87.041, 263, 280/287, 655.1, 87.01, 87.021, 87.05; 180/208; 188/19, 70 R, 72.1, 72.2

[56] References Cited

U.S. PATENT DOCUMENTS

| | | | |
|---|---|---|---|
| 2,330,147 | 9/1943 | Rodriguez | 280/87.04 |
| 3,620,547 | 11/1971 | Vaverek | 280/87.04 |
| 4,763,913 | 8/1988 | Ehrlich | 280/281 |
| 4,799,701 | 1/1989 | Lindau et al. | 280/87.041 |
| 4,799,702 | 1/1989 | Wang | 280/87.041 |
| 4,821,832 | 4/1989 | Patmont | 280/87.041 |
| 4,842,091 | 6/1989 | Badsey | 280/219 |
| 4,911,457 | 3/1990 | Ishikawa | 280/240 |
| 5,265,695 | 11/1993 | Piazzi | 180/208 |
| 5,388,659 | 2/1995 | Pepe | 180/219 |
| 5,470,089 | 11/1995 | Whitson et al. | 280/87.041 |
| 5,695,021 | 12/1997 | Schaffner et al. | 280/603 |

*Primary Examiner*—Lanna Mai
*Assistant Examiner*—Michael Mar

[57] ABSTRACT

A folding, portable, ultralight, non motorized scooter comprising an elongated, contoured main body having a forward end, and a rearward end, a generally horizontal stepping platform between a rear wheel and a steerable front wheel, a generally vertical steering assembly rotatably and upwardly connected to the front wheel; a folding mechanism included between the steering column assembly and the front yoke of the scooter, whereby the steering assembly can be collapsed and secured generally parallel to the stepping platform; a mechanism for braking including a rear wheel mudguard pivotally hinged to the main body at one end and being slidable free within the rear yoke at the opposite end, a set of levers and a brake pad hinged between the rear mud guard and the rear yoke on each of the two sides of the rear wheel, whereby stepping on the mudguard brings the scooter to a stop.

8 Claims, 16 Drawing Sheets

FOLDING, PORTABLE, NON MOTORIZED TWO WHEEL SCOOTER

This application claims benefit of Provisional Appl. 60/066,732 filed Nov. 21, 1997.

BACKGROUND OF THE INVENTION

1. Field of the Invention

This invention relates to two wheeled scooters, and more specifically to a portable, folding, non-motorized scooter, operated by a rider in a standing position.

2. Description of the Prior Art

Two wheel scooters have long been trying to fill a need in transportation. However, they have fallen short of their potential. Despite being lighter and easier to ride than bicycles, they still suffer the inconvenience of being too bulky to be carried along when not being ridden. At their best, prior scooters have been considered an amusing toy.

Motorized scooters have been proposed which can be folded for being carried by the rider. Even so, the portability of the motorized scooters can be strongly questioned when considering the weight of the scooter itself, plus the weight of its engine, plus the weight of the fuel being carried in its fuel tank.

Folding two wheeled scooters are shown in U.S. Pat. Nos. 4,821,832, D 317,954, 4,842,091 and 5,388,659.

Motorized two-wheeled scooters have features that actually limit their usefulness. By having either a gasoline reservoir or an acid/lead battery they are forbidden by law to be carried on public transportation means such as buses and trains. Stores, schools, and banks will not allow them inside their premises, thus limiting their usefulness. A bicycle is a faster, longer range vehicle than a scooter but cannot be carried wherever it is ridden. If a scooter operator is forced to leave it outside the premises or to not be able to board a bus, or a train, the scooter must compete with bicycles.

Present scooters have the same carrying limitations as bicycles. This is the reason why two wheeled scooters have been nearly wiped out of the markets in the world.

Motorized two wheel scooters do little for the rider's health, since there is hardly any exercise involved in riding them. Also, they have proven to be unsafe because of being capable of high speeds while providing little protection.

The traditional non-motorized two wheeled scooters have always been bulky, heavy and some of them are further complicated by the addition of levers, cables and bicycle type brake systems.

Traditional two wheeled scooters are shown in U.S. Pat. Nos. 4,763,913 to Ehlrich, No. 4,911,457 to Ishikawa and 5,470,089 to Witson and Bogdanovich. Hundreds of scooters might have practical or exotic features, but lack the crucial portability or folding capabilities.

Most prior art scooters also lack suitable braking systems. In contradistinction, the instant invention discloses a compact, rugged and reliable braking system which is ideally combined with the portable folding aspects of the invention.

SUMMARY OF THE INVENTION

The general purpose of the present invention is to provide a new and improved scooter which has all the advantages of the prior art and none of the disadvantages, to be used mainly for, but not limited to, transportation.

The present invention essentially comprises a scooter having an elongated, contoured main body having a forward end and a rearward end. The main body includes a tubular structure in the form of two spaced rigid tubes secured to a generally vertical tubular support member at the forward end. The tubes extend downwardly and outwardly to a first intermediate location wide enough to secure a stepping platform to safely support the foot of a person. The rigid spaced tubes then extend horizontally and parallel to each other between the first intermediate location and a second intermediate location from where they extend further rearwardly and slightly upwardly to form a rear yoke. The space provided between the first and the second intermediate locations is enough to secure the stepping platform on the main body. The platform permits the operator to stand on it with one foot while the other foot pushes the scooter forward.

In the preferred embodiment, the stepping platform extends from the forward end of the main body, downwardly and then horizontally, to the beginning of the rear yoke. Thus the downward portion of the platform serves as a front mudguard. The generally vertical tubular support member is secured to the main body forward end in a vertical plane of the main body. Received within said tubular support member is a front yoke which rotates relative to the tubular support member. The front yoke carries a front wheel for rotation. A lower segment of a folding mechanism is secured to the upper end of the front yoke. An upper segment of the folding mechanism is secured to the lower part of a steering assembly. The two segments of the folding mechanism are coupled by a pivot at one end and a latch at the opposite end creating a locking/unlocking hinge. The purpose of the hinge is to lock said steering assembly in the upright position when riding the scooter and to unlock the steering assembly when folding the scooter. The steering assembly in the preferred embodiment comprises a lower body with a portion of the folding mechanism attached to its lower end and a telescoping upper body, slidable within the lower body. A perpendicular handle is attached to the telescoping upper body for the purpose of steering the front wheel of the scooter. The steering assembly is secured in a horizontal position, when the scooter is folded, by a securing bracket on the rearward end of the scooter. The steering assembly provides an optional way to hold a bag or portfolio hanging in front of the steering assembly. In the operating position the scooter is longer because the front wheel is further away due to the projecting shape of the front yoke, thus improving the handling of the scooter. In the folded position, the front wheel is moved closer to the main body by turning the steering assembly 180 degrees, shortening the overall length of the scooter for compactness. The optional bag or portfolio can be moved from the outer to the inner side of the steering assembly, sandwiching it between the collapsed and secured steering assembly and the stepping platform, when the scooter is folded.

A rear wheel is secured to a rear yoke at the man body rearward end and is mounted for rotation about an axle which is normally to the vertical plane of the main body. A rear wheel mud guard-brake functions as a mud guard and also as a means for braking. The rear wheel mud guard-brake comprises a round shaped fender approximately contouring lengthwise and widthwise the upper half of the rear wheel. The fender is hinged at one end to an axle attached to both sides of the rear yoke of the scooter. A guide-stop limits fender rotation at the other end. By stepping on the mudguard with the free foot pressure is applied on the rear wheel to slow down or to stop.

In the preferred embodiment of the scooter, the mudguard-brake includes a set of levers located between the rear mud guard and the rear yoke on each of the two sides of the rear wheel. The levers include a brake pad on each side of the rear wheel moved inwardly by stepping on the mud guard-brake. The brake pads apply pressure to each side of the rear wheel bringing the scooter to a stop. Upon releasing pressure from the mud guard-brake, it is returned to normal position by means of a spring.

The scooter of the present invention permits the operator to carry it anywhere with no physical or legal limitations. The scooter of the present invention can be so lightweight, that it may not be any more difficult to carry that it is to carry a one gallon bottle of milk, or a grocery bag. It can be ridden from home to a bus stop, be folded almost instantly to be carried on a bus or train, placed between the legs of the rider while seated, occupying no extra space, and be unfolded and ready to be ridden almost instantly once the rider gets off the bus or the train, to continue to the point of destination.

The unique scooter of the present invention combines the portability of a motorized two wheel scooter with the simplicity of a non-motorized two wheel scooter while adding new features, altogether. The result is an ultralight, instant folding-unfolding, muscle powered, vehicle that requires no training or hardly any skill for riding on it.

Several objects and advantages of the present invention are:

to provide an ultralight vehicle, easy to fold, easy to carry along, and serving as a transportation link between connection points on a commuting trip;

to provide a vehicle which is easily ridden by anyone, regardless of age and which requires no training or special skills to ride;

to provide a vehicle which competes strongly as a transportation alternative to destinations within a one mile radius, be it home, office, bank, school or disabled car;

to provide a vehicle which will serve as emergency transporation kept in the trunk of a car;

to provide a vehicle which outperforms manual running with a fraction of the effort;

to provide emergency transportation in the event of car breakdowns and traffic jams;

to provide a vehicle which allows the rider to exercise while being transported and help reduce heart disorders due to lack of exercise;

to provide a vehicle which will conserve energy resources, reduce pollution; and to provide a vehicle for transportation, enjoyment.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1A:
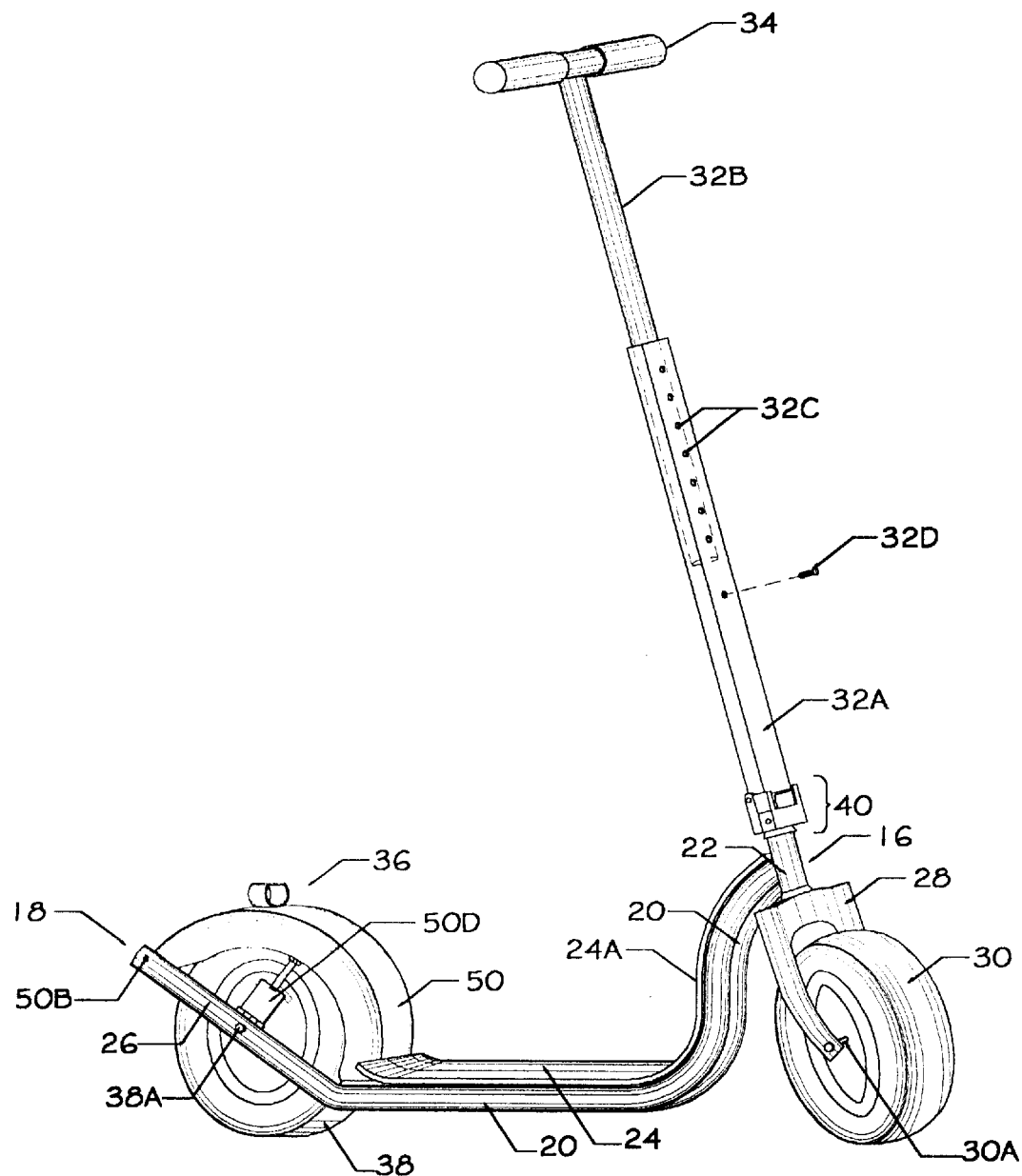
FIG. 1A shows a side view in perspective of the scooter, having a telescoping steering assembly in operating position.
Figure 1B:
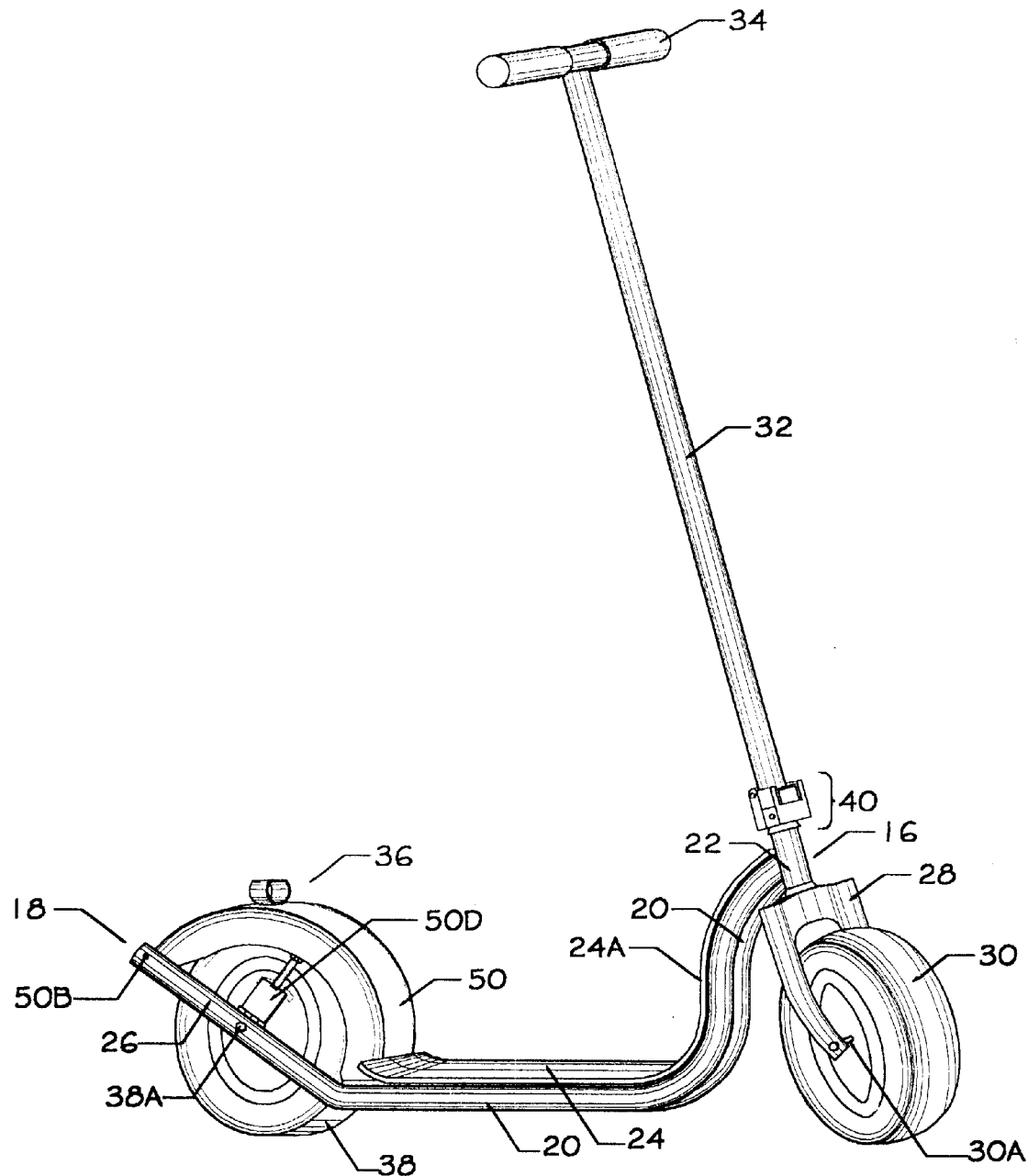
FIG. 1B shows a side view in perspective of the preferred embodiment of the scooter, with the steering assembly in operating position, constructed in accordance with an alternate embodiment of the invention.
Figure 2:
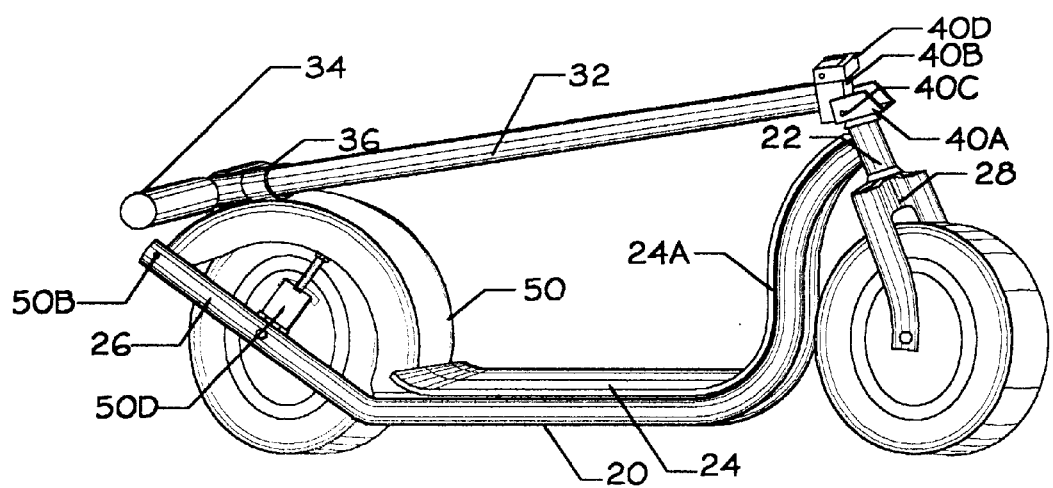
FIG. 2 shows a side view in perspective of the preferred embodiment of the scooter, with the steering assembly in folded position.
Figure 3:
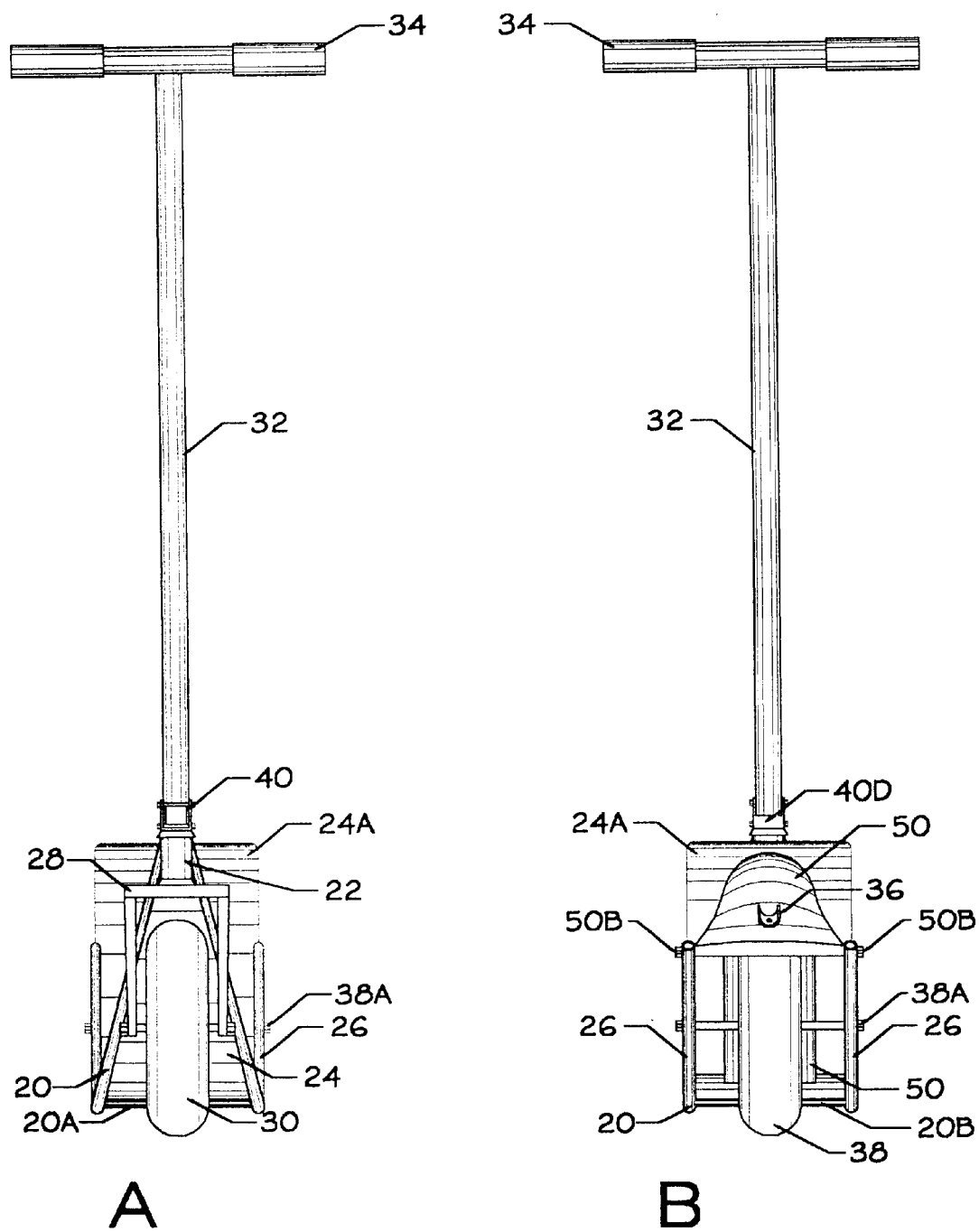
FIG. 3A shows a front view of the scooter of the present invention.
FIG. 3B shows a rear view of the scooter of the present invention.
Figure 4:
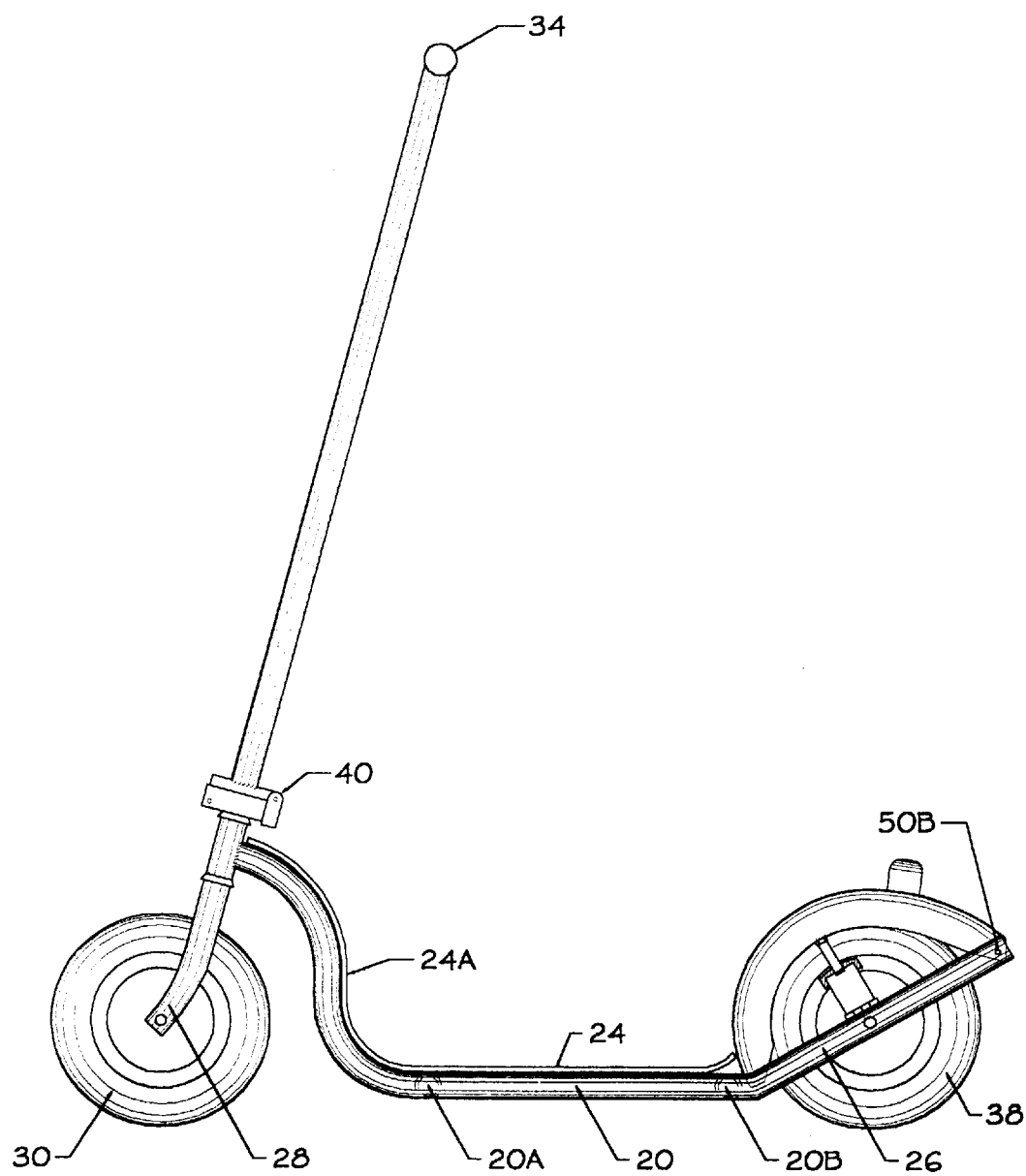
FIG. 4 shows a side view of the scooter in riding position, showing the front yoke projecting forwardly.
Figure 5:
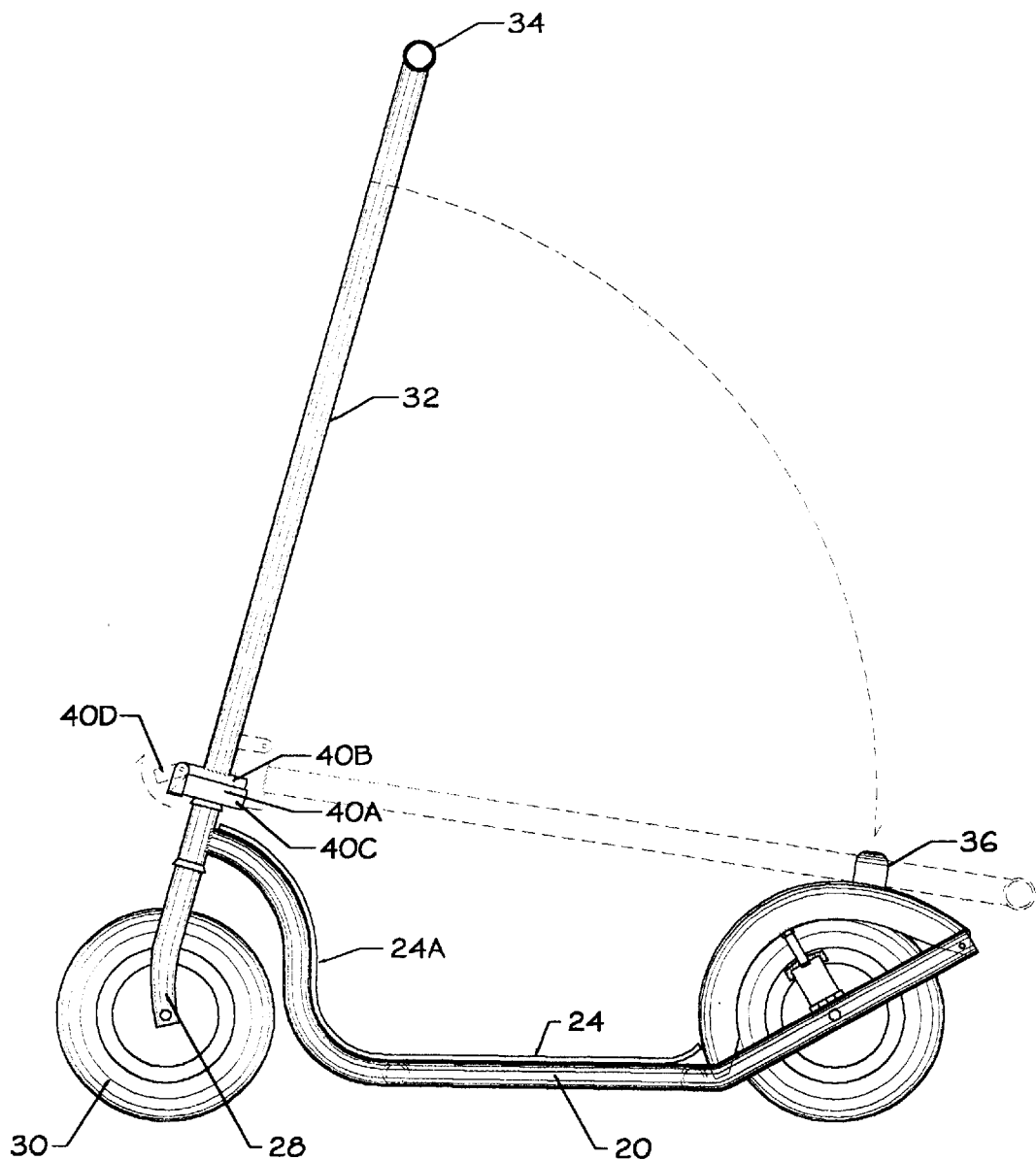
FIG. 5 shows a side view of the scooter showing the front yoke projecting rearwardly in position to be folded.
Figure 6:
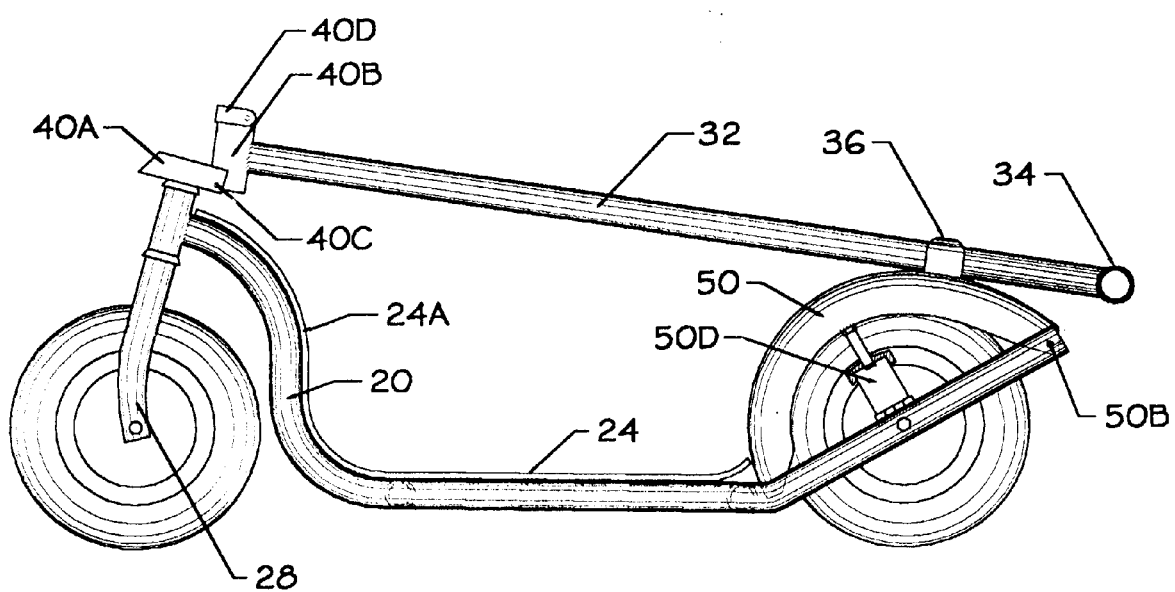
FIG. 6 shows a side view of the scooter with the steering assembly folded.
Figure 8:
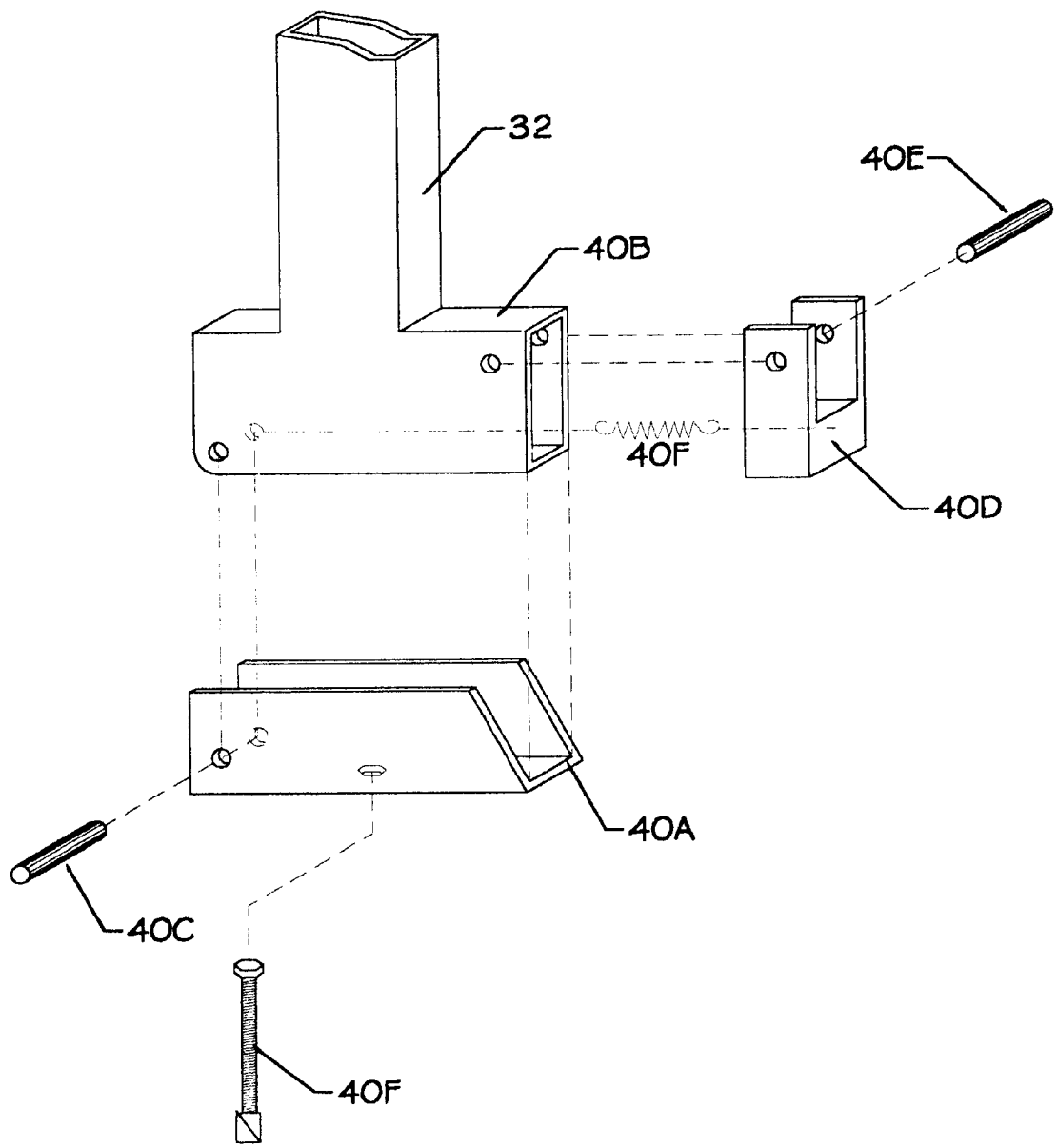
FIG. 8 shows a perspective view in detail of the preferred embodiment of a hinge mechanism that allows the steering assembly of the scooter to be folded.
Figure 11:
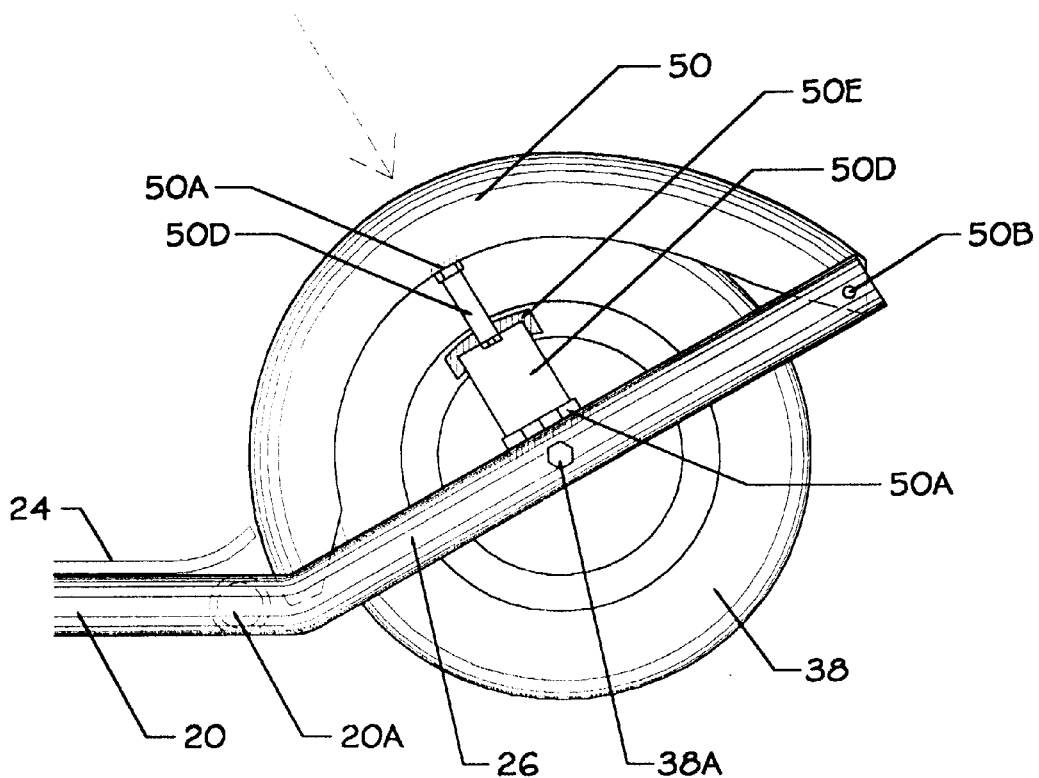
FIG. 11 shows a side view of the rear wheel of the scooter, showing the preferred embodiment of the braking mechanism.
Figure 11A:
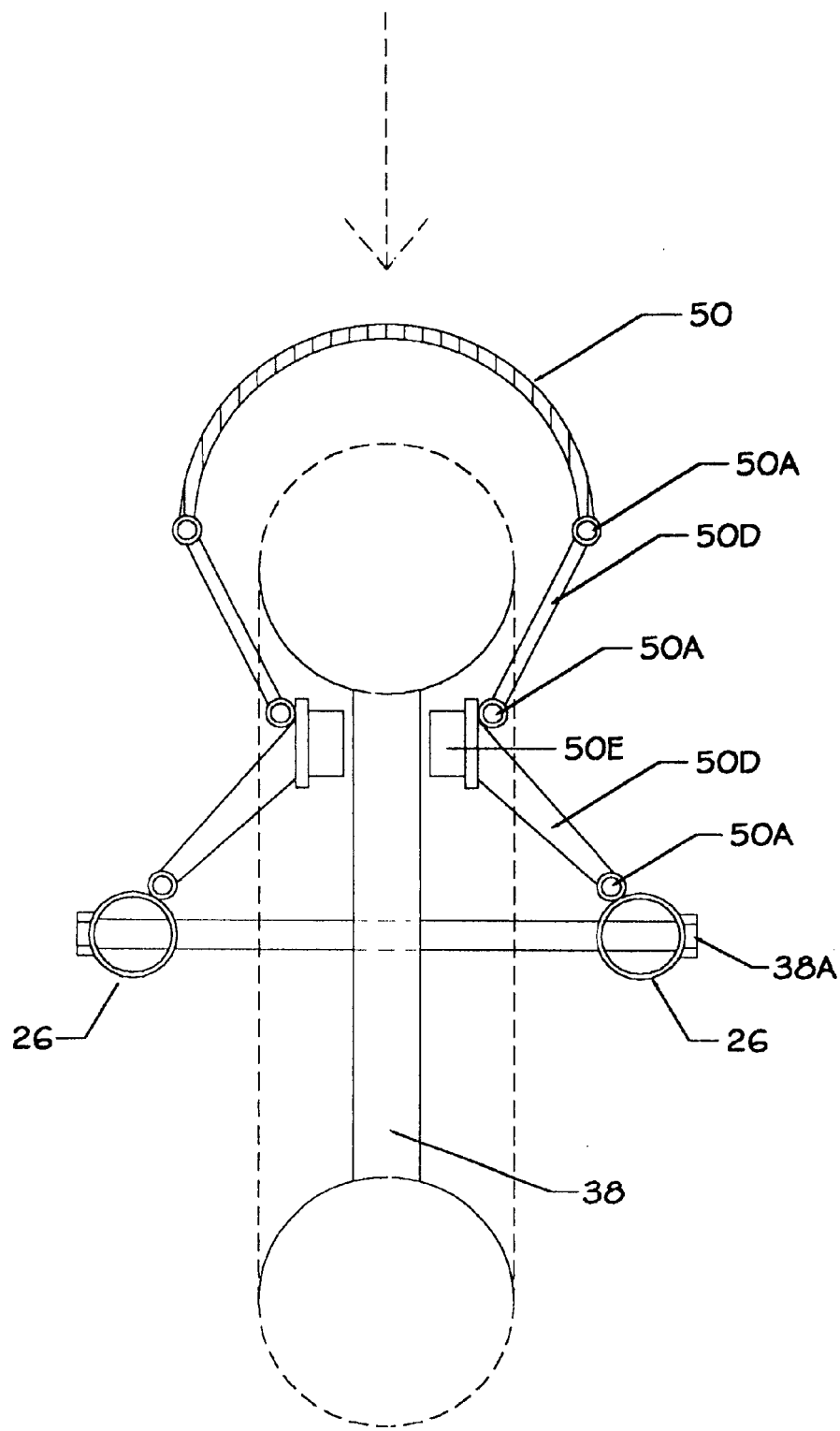
FIG. 11A shows a front view of the preferred embodiment of the braking mechanism.
Figure 11B:
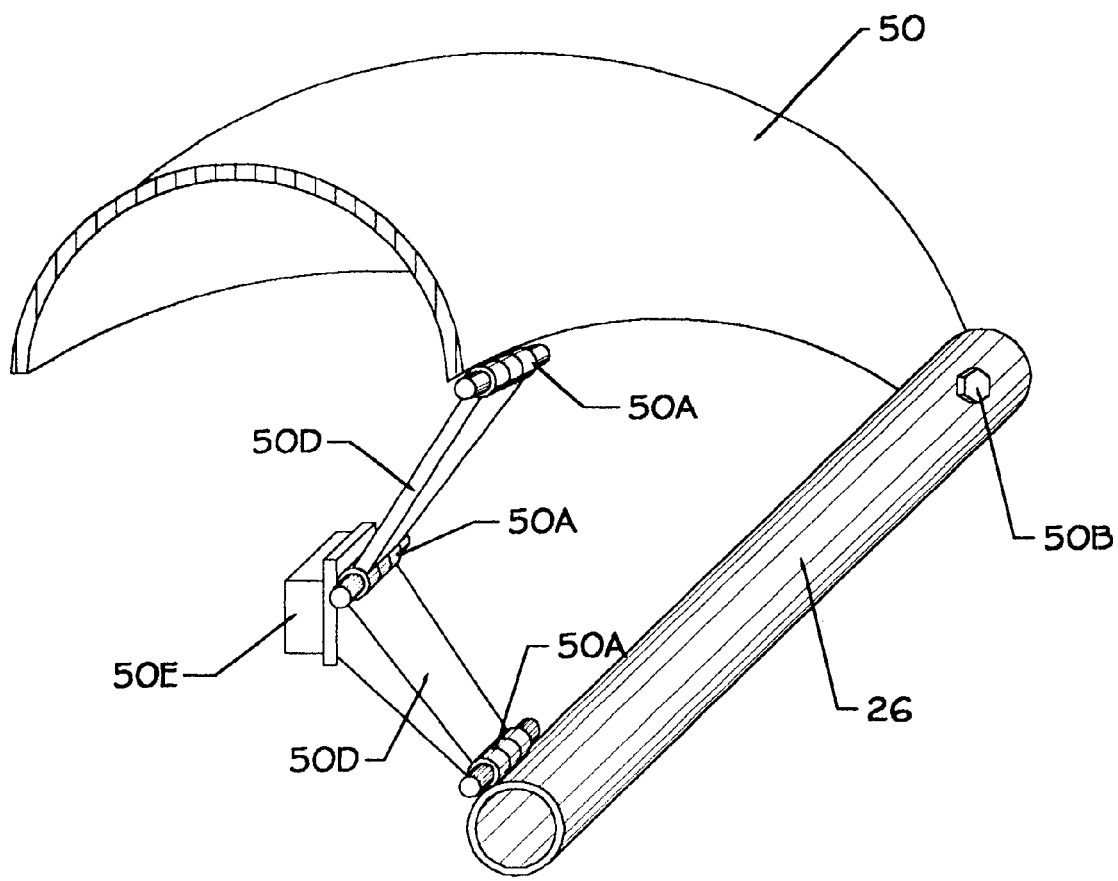
FIG. 11B shows a prespective view of the preferred embodiment of the braking mechanism.

A preferred embodiment of the present invention is illustrated in FIG. 1A a scooter includes an elongated, contoured main body 20 having a forward end 16 and a rearward end 18; said main body includes a tubular structure in the form of two rigid spaced tubes secured to a generally vertical tubular support member 22 at the forward end, and extending downwardly and outwardly to a first intermediate location 20A (FIG. 4) wide enough to secure horizontally a stepping platform 24 to safely support the foot of a person. The rigid spaced tubes extend horizontally and parallel to each other between the first intermediate location and a second intermediate location 20B (FIG. 4). The tubes then extend further rearwardly and slightly upwardly to form a rear yoke 26. A stepping platform 24 is secured on the main body 20 in the space provided between the first 20A and the second 20B intermediate locations. In the preferred embodiment of the scooter the part of the stepping platform 24 which extends from the forward end of the main body, downwardly, to the first intermediate location 20A of the main body, functions as the front wheel mudguard 24A. The vertical tubular support member 22 is secured to the main body forward end in a vertical plane. Journalled within said tubular support member 22 is a front yoke 28 which rotates relative to the tubular support member. The front yoke receives a front wheel 30 for rotation about an axle 30A. A folding mechanism 40 is secured to the upper end of the front yoke 28 by a lower segment 40A (FIGS. 2,6,8) of the folding mechanism. An upper segment 40B (FIGS. 2,6,8) of the folding mechanism is secured to the lower part of a steering assembly 32. The two segments of the folding mechanism are coupled by a pivot 40C (FIGS. 2,6,8) at one end and a latch 40D (FIGS. 2,4,6,8) at the opposite end creating together a locking hinge. In the preferred embodiment the steering assembly 32 includes a lower body 32A with the upper segment 40B of the folding mechanism 40 secured to the lower end of the lower body. Telescoping upper body 32B is slidable relatively to the lower body and adjustable in height with a pin 32D (FIG. 1A) set in the desired hole 32C. A perpendicular handle 34 is secured to said telescoping upper body for the purpose of steering the front wheel of the scooter. The steering assembly is secured in a horizontal position when the scooter is folded. A securing bracket 36 on the rearward end of the scooter receives and secures the telescoping upper body of the steering assembly when folded. A rear wheel 38 is secured to the main body rearward end 18 on rear yoke 26, and mounted for rotation about a horizontal axle 38A (FIGS. 1,3,11A,12A) which is normal to the general vertical plane of the overall scooter. A rear wheel mud guard-brake 50 includes a round shaped element approximately contouring lengthwise and widthwise the upper half of the rear wheel 38. Mudguard 50 is hinged at one end to an axis 50B secured to both sides of the rearward end of the rear yoke 26. The front of mudguard 50 is freely slidable between the two inner sides of the forward end of the rear yoke. A pair of levers 50D are hinged at 50A (FIG. 11) between the rear mud guard 50 and the rear yoke 26 on each side of the rear wheel 38. Levers 50D support a brake pad 50E on each side of the rear wheel. Securing bracket 36 is attached to the top part of mudguard-brake 50.

A second embodiment of the present invention (FIG. 1B) shows the scooter including a non-telescoping, one piece, steering assembly 32.

Figure 7:
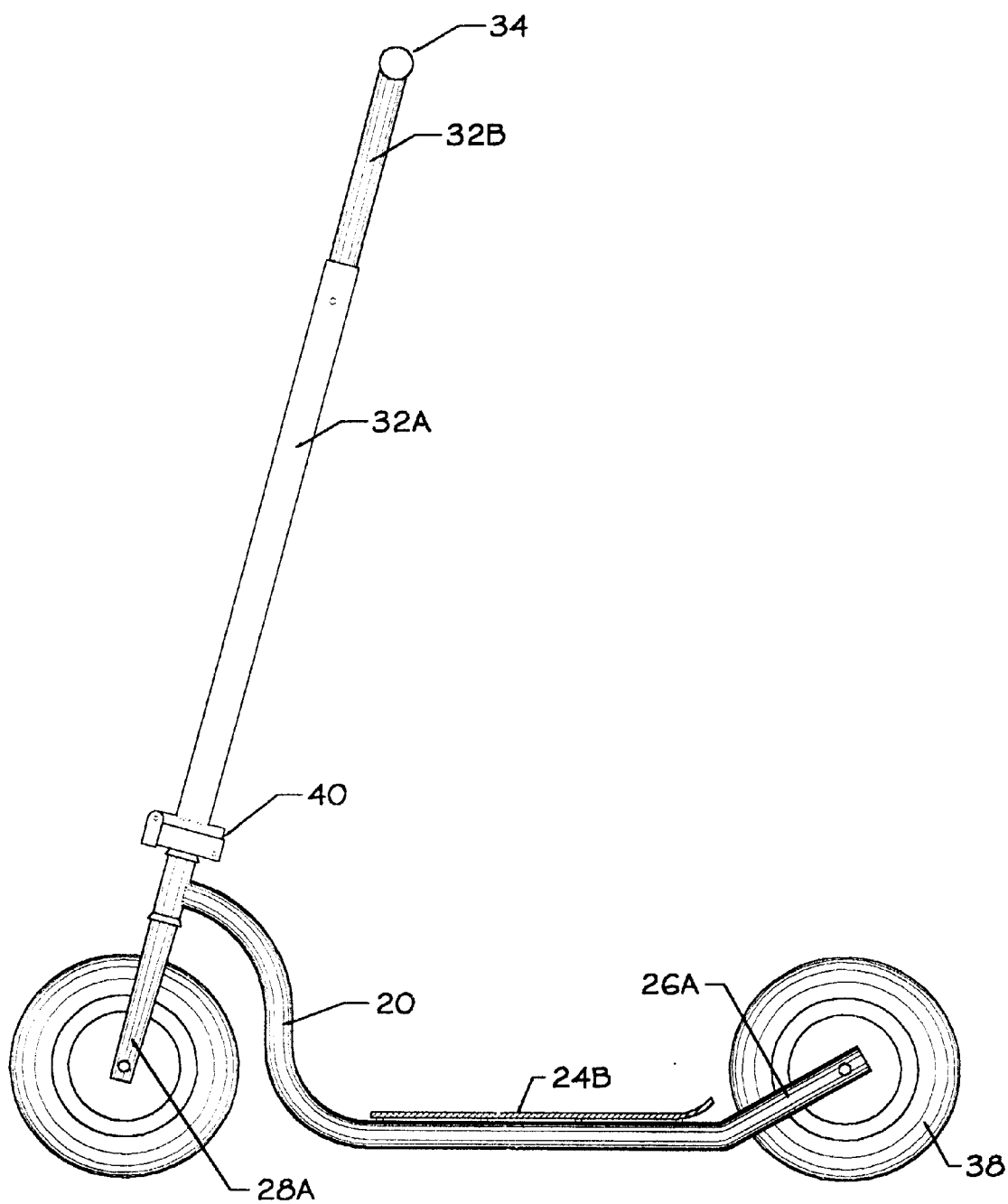
FIG. 7 shows a side view of the scooter having a straight front yoke, a shorter rear yoke, without the front and rear mudguards and without brakes, constructed in accordance with yet another alternate embodiment of the invention.

A third embodiment of the present invention (FIG. 7) shows the scooter including a straight front yoke 28A, a short stepping platform 24B, a short rear yoke 26A, and it is without mudguards or brakes.

Figure 9:
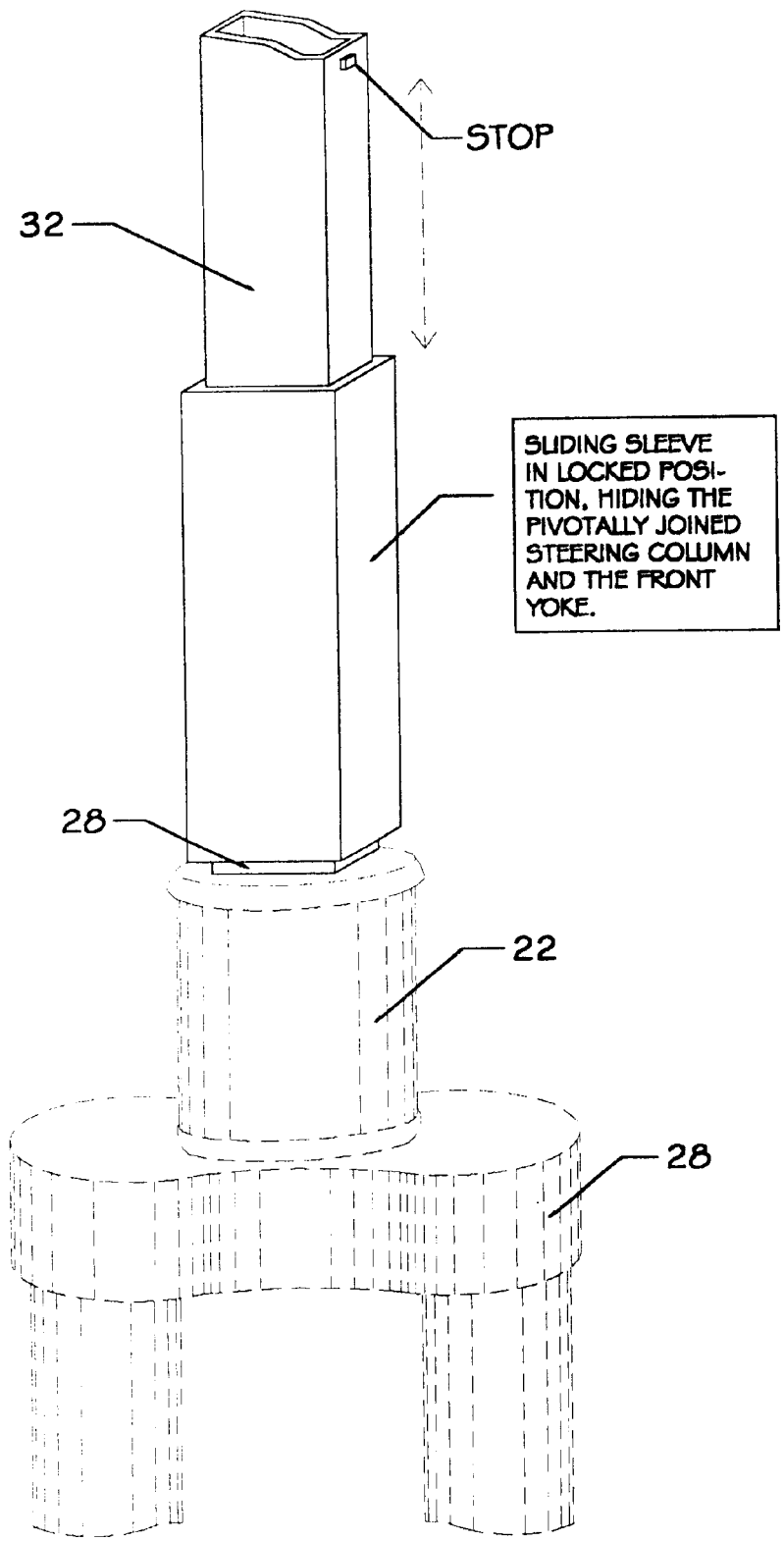
FIG. 9 shows a perspective view of a sliding sleeve type of hinge mechanism that allows the steering assembly of the scooter to be folded, constructed in accordance with yet another alternate embodiment of the invention.

FIG. 9 shows an alternate folding mechanism comprising a sliding sleeve 60 which locks/unlocks the upper end of the front yoke 28 and the lower end of the steering assembly 32, which are hinged together.

Figure 10:
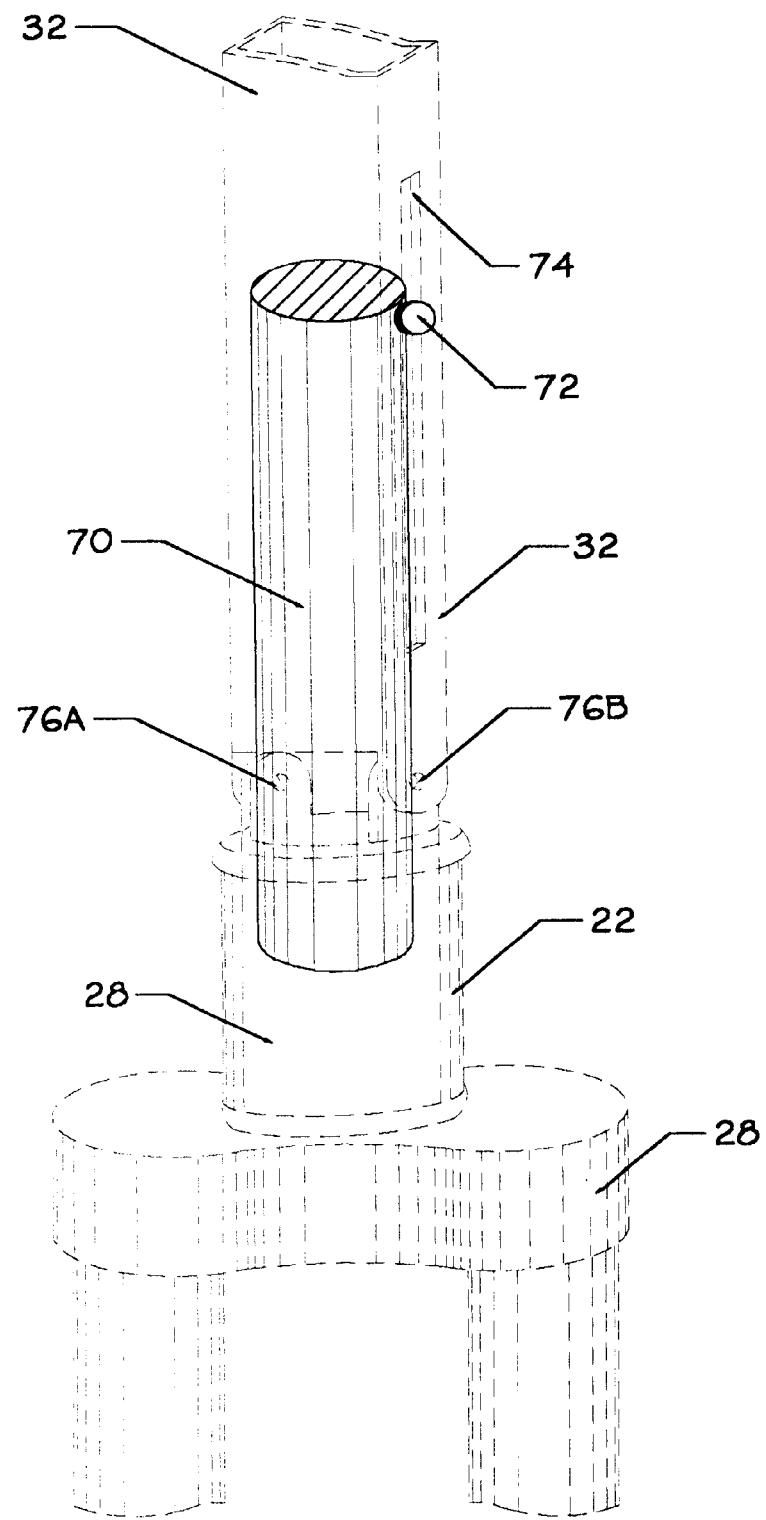
FIG. 10 shows a perspective view of a pin type of hinge mechanism that allows the steering assembly of the scooter to be folded, constructed in accordance with yet another alternate embodiment of the invention.

FIG. 10 shows another folding mechanism comprising a sliding inner pin 70 which has a sliding knob 72 projecting through a sliding groove 74, for locking/unlocking the upper end of the front yoke 28 and the lower end of the steering assembly 32, which are hinged together by axle 76A and axle 76B.

Figure 12A:
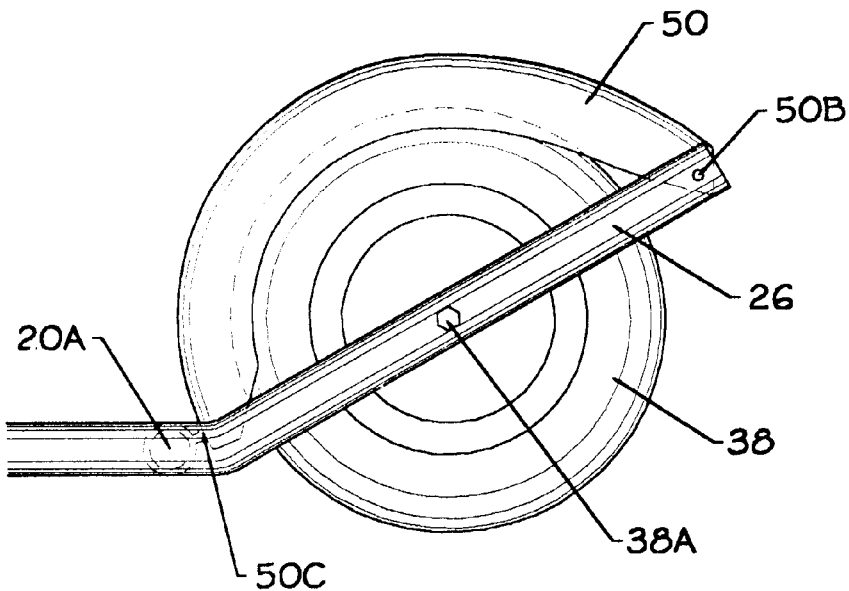
FIG. 12A shows a side view of the mudguard-brake mechanism in braking position, constructed in accordance with yet another alternate embodiment of the invention.
Figure 12B:
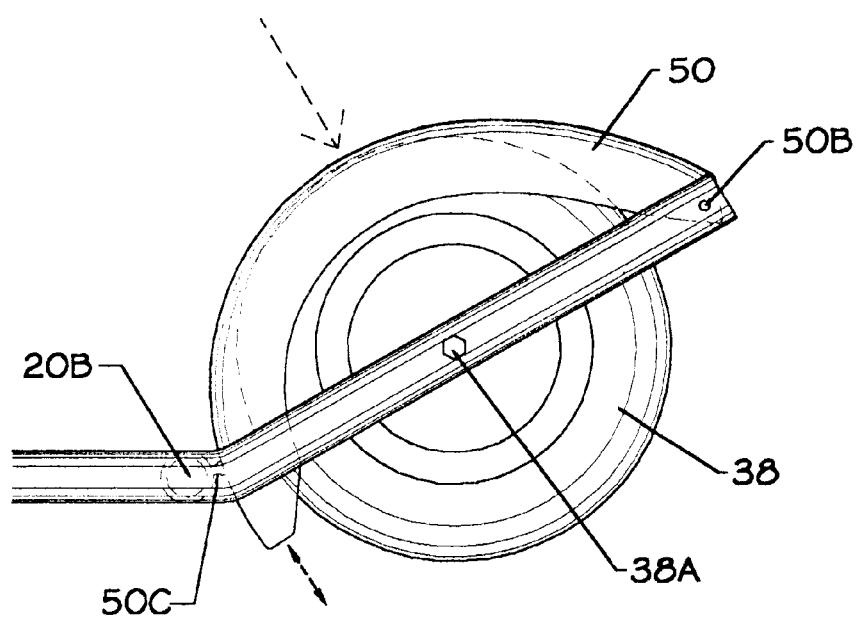
FIG. 12 shows a side view of the mudguard-brake mechanism in normal position, constructed in accordance with yet another alternate embodiment of the invention.
Figure 13:
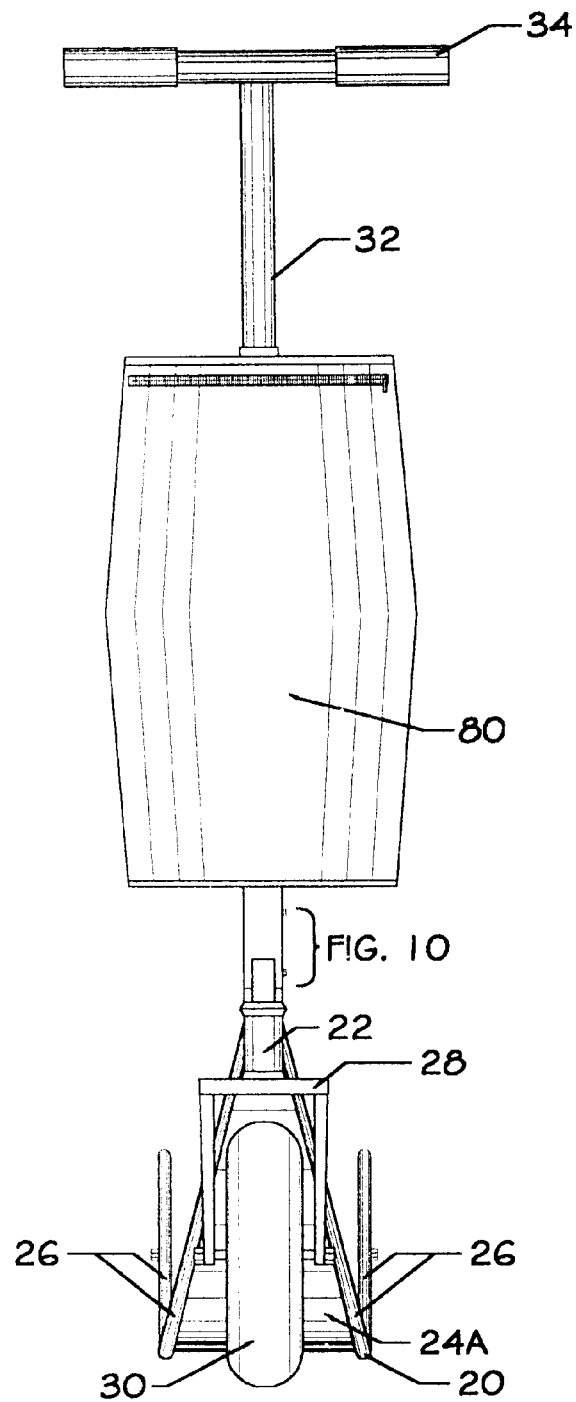
FIG. 13 shows a front view of the scooter with the addition of an accessory that allows the rider to carry a package.

Another embodiment of the brake mechanism is shown in FIGS. 12A and 12B. A rear wheel mud guard-brake 50 includes a round shaped element approximately contouring lengthwise and widthwise the upper half of the rear wheel 38. It is hinged at one end to an axle 50B secured to both sides of the rearward end of the rear yoke 26 of the scooter, and is freely slidable within the two inner sides of the forward end of the rear yoke. A guide-stop 50C prevents said guard from popping out of place. By stepping over the mud guard-brake with the foot being used to push the scooter forward, pressure will be applied on the rear wheel to slow down or stop. When the pressure is released, the mudguard-brake pops back up by a spring return (not shown) included on either side of the mudguard/brake.

With the invention thus explained, it is apparent that various modifications in size, materials, shape, form, function and manner of operation, assembly, use and combination of features can be made without departing from the scope of the invention.

While the invention has been described with a certain degree of particularity it is manifest that many changes may be made in the details of construction and the arrangement and combinations of components without departing from the spirit and scope of this disclosure. It is understood that the invention is not limited to the embodiments set forth herein for purposes of exemplification, but is to be limited only by the scope of the attached claim or claims or descriptions, including the full range of equivalency to which each element thereof is entitled.

Therefore, the foregoing is considered as illustrative only of the principles of the invention and it is not desired to limit the invention to the exact construction and operation shown and described, and accordingly, all suitable modification and equivalents may be resorted to, falling within the scope of the invention.

I claim:

1. A scooter comprising:

a frame including a pair of laterally spaced, longitudinally extending tubular members;

a steering column pivotally mounted to forward ends of the tubular members;

a front wheel rotatable carried by the steering column;

a longitudinally extending platform supported by the tubular members;

a rear wheel rotatably mounted between rearward end portions of the tubular members;

an elongated mudguard positioned above the rear wheel, the mudguard having a rearward end pivotally connected to the rearward end portions of the tubular members for pivotal movement between a raised position and a lowered position, the mudguard being biased to the raised position and being movable to the lowered position by downward force exerted thereon by a users foot;

a pair of brake assemblies positioned along respective lateral sides of the rear wheel, each brake assembly including a rod having an upper end pivotally connected to a respective lateral side of the mudguard;

a lever having a lower end pivotally connected to the rearward end portion of a respective tubular member, an upper end of the lever being pivotally connected to a lower end of the rod; and a brake pad attached to a mounting surface formed at the upper end of the lever; wherein pivotal movement of the mudguard to the lowered position forces the brake pads on the pair of brake assemblies to move laterally inward into engagement with respective lateral sides of the rear wheel for braking the scooter; and the brake assemblies are in a nonbraking mode when the mudguard is in the raised position.

2. The scooter according to claim 1, further comprising a steering assembly attached to an upper end of the steering column for steering the front wheel of the scooter.

3. The scooter according to claim 2, the steering assembly further comprising:
   a folding mechanism attached to the upper end of the steering column for folding the steering assembly into a folded position and for unfolding the steering mechanism into an operative position.

4. The scooter according to claim 3, the folding mechanism further comprising:
   a lower segment attached to the upper end of the steering column, and including a first and second end;
   an upper segment attached to the steering mechanism, and including a first and second end;
   a pivot connecting the first end of the lower segment to the first end of the upper segment; and
   a pivoting latch with a latched and unlatched position; wherein
   when the latch is in the latched position, the second end of the lower segment is held against the second end of the upper segment to thereby maintain the steering mechanism in the operative position; and
   when the latch is in the unlatched position, the second end of the lower segment is allowed to move away from the second end of the upper segment to permit the steering mechanism to pivot to the folded position.

5. The scooter according to claim 4, wherein the folding mechanism further comprises a spring for biasing the latch toward the latched position.

6. The scooter according to claim 5, wherein the steering assembly further comprises:
   a lower body attached to the folding mechanism;
   a telescoping upper body slidably mounted to the lower body for adjusting a length of the steering mechanism; and
   a handle perpendicularly attached to the upper body wherein the handle is turned to steer the scooter.

7. The scooter according to claim 6, further comprising a securing bracket mounted on a top surface of the mudguard, wherein the securing bracket holds the telescoping upper body against the mudguard when the steering mechanism is in the folded position.

8. The scooter according to claim 5, further comprising a securing bracket mounted on a top surface of the mudguard, wherein the securing bracket holds the steering mechanism against the mudguard when the steering mechanism is in the folded position.

* * * * *